(12) United States Patent
Ito

(10) Patent No.: US 11,180,028 B2
(45) Date of Patent: Nov. 23, 2021

(54) VEHICLE NOTIFICATION SYSTEM

(71) Applicant: DENSO CORPORATION, Kariya (JP)

(72) Inventor: Yutaro Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/884,722

(22) Filed: May 27, 2020

(65) Prior Publication Data
US 2020/0376962 A1    Dec. 3, 2020

(30) Foreign Application Priority Data

May 28, 2019    (JP) .............................. JP2019-099566

(51) Int. Cl.
| | | |
|---|---|---|
| *B60K 35/00* | (2006.01) | |
| *B60Q 9/00* | (2006.01) | |
| *G08G 1/0967* | (2006.01) | |

(52) U.S. Cl.
CPC ................ *B60K 35/00* (2013.01); *B60Q 9/00* (2013.01); *G08G 1/0967* (2013.01); *B60K 2370/167* (2019.05); *B60K 2370/172* (2019.05)

(58) Field of Classification Search
CPC .............. B60K 35/00; B60K 2370/172; B60K 2370/167; B60K 2370/1868; B60K 2370/736; B60K 2370/179; B60Q 9/00; G08G 1/0967; B60W 50/14; B60W 30/165; B60W 40/02; B60W 2050/0043; B60W 2050/0077; B60W 2050/143; B60W 2050/146; B60W 2554/20; B60W 2554/4029; B60W 2554/80; B60W 2552/50; B60W 2556/45
See application file for complete search history.

(56) References Cited

U.S. PATENT DOCUMENTS

| | | | | |
|---|---|---|---|---|
| 6,092,021 | A | * | 7/2000 | Ehlbeck .................... G01L 3/26 701/123 |
| 2006/0181399 | A1 | * | 8/2006 | Sumiya .................. B60K 37/02 340/461 |
| 2016/0001693 | A1 | * | 1/2016 | Tamura .............. G01C 21/3697 340/441 |
| 2016/0277911 | A1 | * | 9/2016 | Kang ................... H04B 1/3822 |
| 2018/0261081 | A1 | * | 9/2018 | Suzuki .................. G08G 1/005 |
| 2019/0263367 | A1 | * | 8/2019 | You .......................... B60T 8/58 |

FOREIGN PATENT DOCUMENTS

JP    2012-190152 A    10/2012

* cited by examiner

*Primary Examiner* — Ryan W Sherwin
(74) *Attorney, Agent, or Firm* — Oliff PLC

(57) ABSTRACT

The notification system of a vehicle of the present disclosure includes a communication device, a millimeter wave radar device, an imaging device, an ACCECU, and a notification device. The imaging device is configured to acquire surrounding information of the vehicle. The ACCECU is configured to set priority of a plurality of items of notification information based on the surrounding information of the vehicle. The notification device is configured to notify a notification target person of the plurality of items of notification information based on the priority set by the ACCECU.

16 Claims, 11 Drawing Sheets

VEHICLE NOTIFICATION SYSTEM

CROSS-REFERENCE TO RELATED APPLICATION

This application is based on and claims the benefit of priority from earlier Japanese Patent Application No. 2019-099566 filed May 28, 2019 the description of which is incorporated herein by reference.

BACKGROUND

1. Technical Field

The present disclosure relates to a vehicle notification system.

2. Related Art

Known techniques related to a vehicle notification system include a technique for transmitting the notification information to the driver in descending order of importance based on preset importance information in a case where there is a plurality of items of notification information.

SUMMARY

The present disclosure provides a vehicle notification system. As an aspect of the present disclosure, a vehicle notification system includes a surrounding information acquiring unit, a priority setting unit, and a notification unit. The surrounding information acquiring unit is configured to acquire surrounding information of a vehicle. The priority setting unit is configured to set priority of a plurality of items of notification information based on the surrounding information of the vehicle. The notification unit is configured to perform notification of at least one item selected from a plurality of items of notification information to a notification target person based on the priority set by the priority setting unit.

DETAILED DESCRIPTION OF THE PREFERRED EMBODIMENTS

Figure 1:
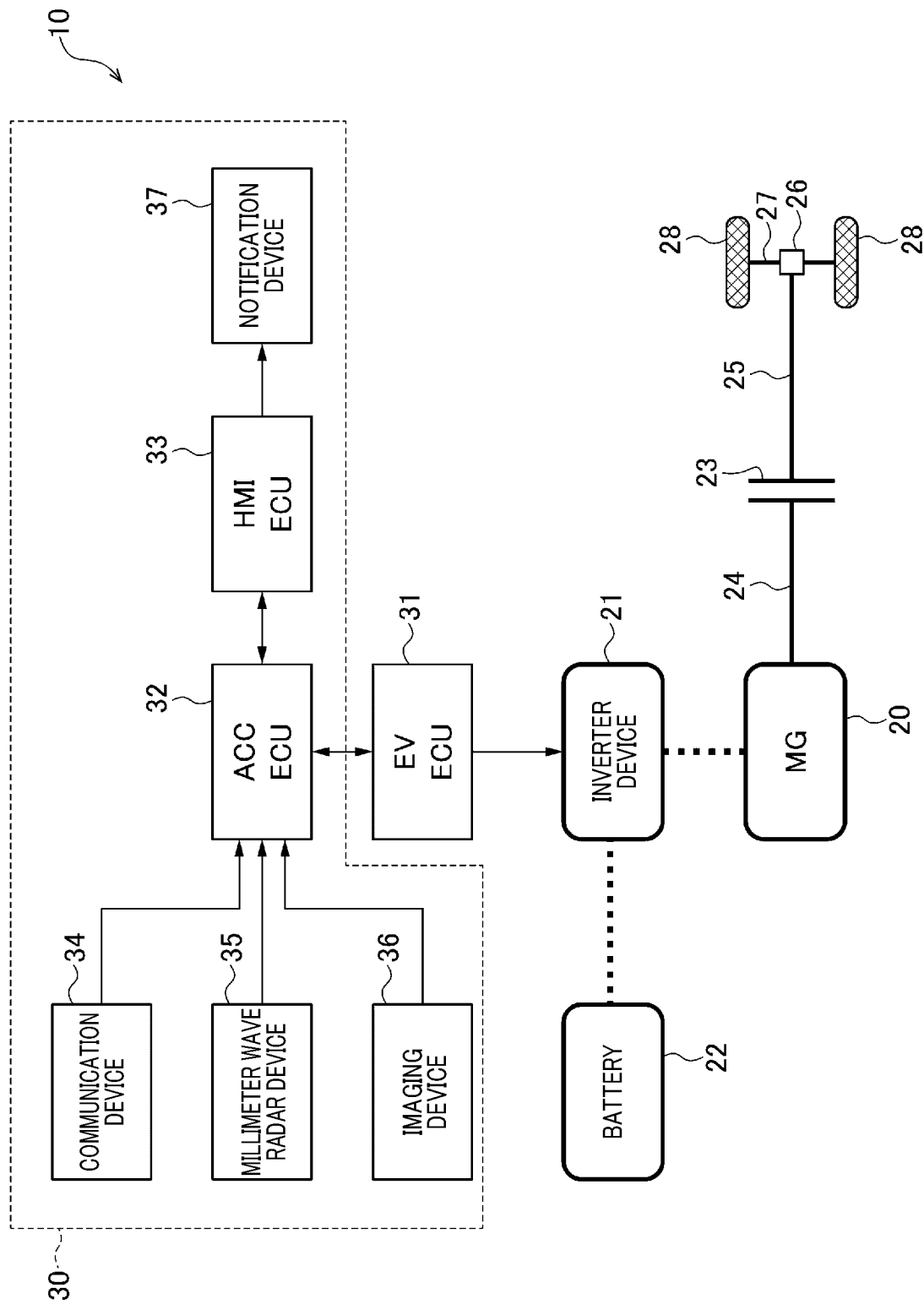
FIG. 1 is a block diagram illustrating a schematic configuration of a vehicle according to a first embodiment.

Conventionally, there are vehicle notification systems such as described in Japanese Unexamined Patent Application Publication No. 2012-190152 (hereinafter referred to as "JP 2012-190152 A") below. The notification system described in JP 2012-190152 A is configured such that, in a case where there is a plurality of items of notification information, the notification information is transmitted to the driver in descending order of importance based on preset importance information. Accordingly, the driver is enabled to recognize the important information in order.

The situation in which the vehicle is located changes moment by moment depending on the traveling conditions of the surrounding vehicles traveling around the vehicle, the relative distance of the host vehicle to objects on the road such as pedestrians, guardrails and the like existing around the vehicle, and the like. Therefore, when the order of priority of a plurality of items of notification information is set in advance as in the case of the notification device described in Patent Literature 1, there is a possibility that the information actually notified to the driver will not correspond to the situation where the vehicle is actually located.

In view of such circumstances, an object of the present disclosure is to provide a vehicle notification system that is capable of transmitting more appropriate notification information to a notification target person.

As an aspect of the present disclosure, the vehicle notification system for solving the problems described above includes a surrounding information acquiring unit, a priority setting unit, and a notification unit. The surrounding information acquiring unit is configured to acquire surrounding information of a vehicle. The priority setting unit is configured to set priority of a plurality of items of notification information based on the surrounding information of the vehicle. The notification unit is configured to perform notification of at least one item selected from a plurality of items of notification information to a notification target person based on the priority set by the priority setting unit.

With this configuration, the priority of the plurality of items of notification information is set based on the surrounding information of the vehicle, so the notification information having a higher priority according to the surrounding information of the vehicle is notified to the notification target person. Therefore, more suitable notification information may be transmitted to the notification target person.

Note that the reference numbers in the method described above and in the parentheses in the claims are examples indicating the correspondence with specific methods in the embodiments described later.

According to the present disclosure, a vehicle notification system capable of transmitting more appropriate notification information to a notification target person may be provided.

Hereinafter, an embodiment of a vehicle notification system will be described with reference to the drawings. In order to make it easier to understand the description, the same components are denoted by the same reference numbers as much as possible in each drawing, and redundant descriptions are omitted.

First Embodiment

As illustrated in FIG. 1, a vehicle 10 includes a motor generator 20, an inverter device 21, a battery 22, and a clutch 23. The vehicle 10 of the present embodiment is a so-called electric automobile that runs based on power from a motor generator 20.

The battery 22 includes a secondary battery such as a rechargeable lithium ion battery or the like. The inverter device 21 converts DC power charged in the battery 22 to AC power, and supplies the converted AC power to the motor generator 20. The motor generator 20 is driven based on the AC power supplied from the inverter device 21, and rotates a first power transmission shaft 24. The first power transmission shaft 24 is connected to a second power transmission shaft 25 via the clutch 23. The clutch 23 is able to transition between a connected state in which, by connecting the first power transmission shaft 24 and the second power transmission shaft 25, power (torque) may be transmitted between the first power transmission shaft 24 and the second power transmission shaft 25, and a non-connected state in which the connection between the first power transmission shaft 24 and the second power transmission shaft 25 is released and transmission between the first power transmission shaft 24 and the second power transmission shaft 25 is blocked. In a case where the clutch 23 is in the connected state, the power (torque) transmitted from the motor generator 20 to the first power transmission shaft 24 is transmitted to the wheels 28 of the vehicle 10 via the second power transmission shaft 25, a differential gear 26, and a drive shaft 27. The vehicle 10 travels by the wheels 28 rotating based on this power.

The motor generator 20 performs regenerative power generation when the vehicle 10 is braked. In other words, the braking force acting on the wheels 28 when braking the vehicle 10 is inputted to the motor generator 20 via the drive shaft 27, the differential gear 26, the second power transmission shaft 25, the clutch 23, and the first power transmission shaft 24. The motor generator 20 generates electric power based on the power inputted from the wheels 28. The power generated by the motor generator 20 is converted from AC power to DC power by the inverter device 21 and used to charge the battery 22.

The vehicle 10 includes an electric vehicle (EV) electronic control unit (ECU) 31 (hereinafter, also referred to as "EVECU 31"), an adaptive cruise control (ACC) ECU 32 (hereinafter, also referred to as "ACCECU 32"), a human machine interface (HMI) ECU 33 (hereinafter, also referred to as "HMIECU 31"), a communication device 34, a millimeter wave radar device 35, an imaging device 36 and a notification device 37. Each ECU 31 to 33 is mainly configured by a microcomputer having a storage device such as a CPU, a ROM, a RAM and the like, and executes various controls by executing a program stored in the storage device in advance. In the present embodiment, the notification system 30 of the vehicle 10 is configured by an ACCECU 32, a HMIECU 33, a communication device 34, a millimeter wave radar device 35, an imaging device 36, and a notification device 37.

The EVECU 31 calculates a target power value for the vehicle according to the depression amount of the accelerator pedal of the vehicle 10, and controls the driving of the inverter device 21 so that the output power of the motor generator 20 becomes the target power value. In addition, the EVECU 31 controls driving of the inverter device 21 so that the battery 22 is charged with electric power generated by the regenerative power generation of the motor generator 20 when the vehicle 10 is braked.

The communication device 34 is a device that enables two-way communication with surrounding vehicles traveling around the vehicle 10 and with a traffic management device provided on the road. The communication device 34 acquires various kinds of information about the surrounding vehicles by communicating with the surrounding vehicles, and acquires various kinds of traffic information by communicating with the traffic management device. The traffic information includes the installation location of traffic lights, traffic congestion information, and the like. The communication device 34 transmits the acquired various information to the ACCECU 32.

The millimeter wave radar device 35 emits radio waves around the vehicle 10 and detects objects existing around the vehicle based on reflected waves of the radio waves. The objects detected by the millimeter wave radar device 35 include not only vehicles traveling around the vehicle, but also people, obstacles and the like existing around the vehicle. The millimeter wave radar device 35 transmits information about the detected objects to the ACCECU 32.

The imaging device 36 generates image data of the surroundings of the vehicle 10 by capturing images of the surroundings of the vehicle 10 at a predetermined cycle. The imaging device 36 transmits the generated image data to the ACCECU 32.

Note that in the present embodiment, the communication device 34, the millimeter wave radar device 35, and the imaging device 36 correspond to a surrounding information acquiring unit that acquires surrounding information of the vehicle 10.

The ACCECU 32, via the communication device 34, acquires various information about the surrounding vehicles and traffic information. In addition, the ACCECU 32 acquires object detection information that is transmitted from the millimeter wave radar device 35, and acquires information such as the relative position, the relative speed and the like of objects with respect to the vehicle 10 based on image data of the surroundings of the vehicle 10 that is transmitted from the imaging device 36. The ACCECU 32 executes driving support control of the vehicle 10 based on the acquirable information.

More specifically, the ACCECU 32, based on the fact that an operation unit provided in the vehicle 10 is operated by an occupant, executes adaptive cruise control (ACC) that controls the traveling of the vehicle 10 so as to follow a preceding vehicle that is traveling ahead of the vehicle 10. The ACCECU 32 calculates the acceleration required to cause the vehicle 10 to follow the preceding vehicle when executing ACC control, and transmits the calculated acceleration to the EVECU 31 as an acceleration command value. The acceleration command value is set to a positive value when causing the vehicle 10 to accelerate, and is set to a negative value when causing the vehicle 10 to decelerate. Moreover, the absolute value of the acceleration command value is set to a larger value as the acceleration and the deceleration become larger. The EVECU31 determines whether to cause the vehicle 10 to accelerate or decelerate based on whether the acceleration command value transmitted from ACCECU32 is a positive value or a negative value. When causing the vehicle 10 to accelerate, the EVECU 31 calculates a target power value corresponding to the acceleration command value, and controls driving of the inverter device 21 so that the power corresponding to the calculated target power value is outputted from the motor generator 20. On the other hand, when causing the vehicle 10 to decelerate, the EVECU 31 controls driving of the inverter device 21 so that regenerative power generation is performed by the motor generator 20.

The HMIECU 33, by controlling the notification device 37 mounted in the vehicle 10 based on notification information transmitted from the ACCECU 32, performs various notifications to the occupant of the vehicle 10. As the notification device 37, a speaker, a display, or the like may be used. In the present embodiment, the notification device 37 corresponds to a notification unit. Moreover, the occupant of the vehicle 10, including the driver of the vehicle 10, corresponds to the notification target person.

Next, a procedure for setting notification information to be executed by the ACCECU 32 will be described with reference to FIG. 2. Note that the ACCECU 32 repeatedly executes the processing illustrated in FIG. 2 at a predetermined cycle when the driving support control of the vehicle 10 is not being executed, or in other words, when the driver is manually driving the vehicle 10.

Figure 2:
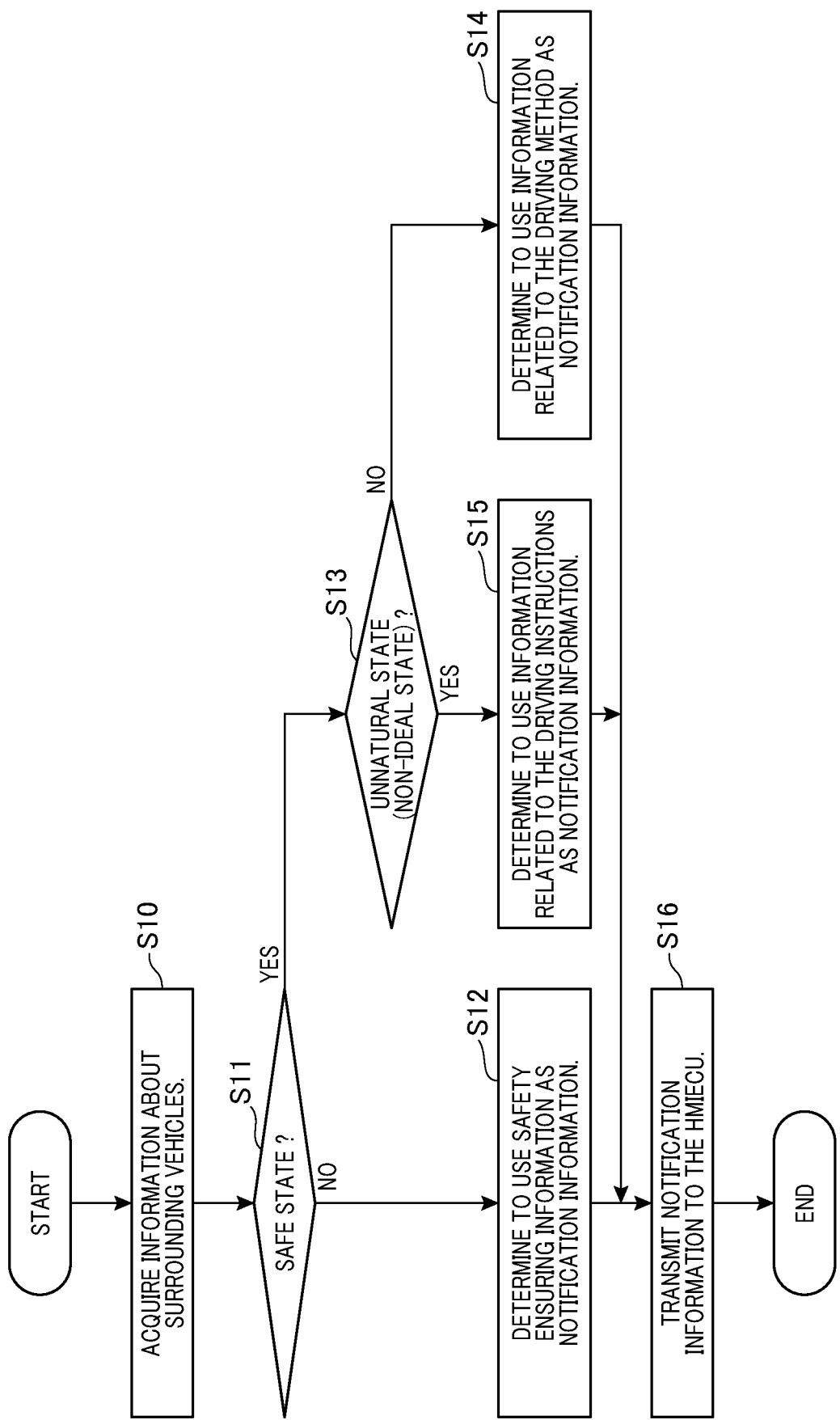
FIG. 2 is a flowchart illustrating a procedure of processing that is executed by an ACCECU according to a first embodiment.

As illustrated in FIG. 2, the ACCECU 32 first, as the process of step S10, acquires information such as the relative position, the relative speed and the like of surrounding vehicles traveling around the vehicle 10 including the preceding vehicle based on information that is detectable by the communication device 34, the millimeter wave radar device 35, and the imaging device 36.

Next, as the process of step S11, the ACCECU 32 determines whether the vehicle 10 is in a safe state. More specifically, the ACCECU 32 acquires information of the relative distance and relative speed of the preceding vehicle based on information that is detectable by the millimeter wave radar device 35 and the imaging device 36. The ACCECU 32 determines that the vehicle 10 is not in a safe state in a case where the relative distance of the preceding vehicle is equal to or less than a first distance threshold value Dth1, or in a case where the relative speed of the preceding vehicle is equal to or less than a first speed threshold value Vth1. Note that the relative speed of the preceding vehicle indicates a positive value in a case where the absolute speed of the preceding vehicle is faster than the absolute speed of the vehicle 10, and indicates a negative value in a case where the absolute speed of the preceding vehicle is less than the absolute speed of the vehicle 10. Moreover, the first distance threshold value Dth1 and the first speed threshold value Vth1 are set to positive values. In other words, the ACCECU 32 determines that the vehicle 10 is not in a safe state in a case where the relative distance of the preceding vehicle is equal to or less than the first distance threshold value Dth1. The ACCECU 32 determines that the vehicle 10 is not in a safe state in a case where the relative speed of the preceding vehicle is a negative value. The ACCECU 32 determines that the vehicle 10 is not in a safe state in a case where the relative speed of the preceding vehicle is a positive value and the relative speed of the preceding vehicle is equal to or less than the first speed threshold value Vth1. In a case where the vehicle 10 is not in a safe state, the ACCECU 32 makes a negative determination in the process of step S11, and in the process of step S12, determines to use safety ensuring information necessary for ensuring the safety of the vehicle 10 as notification information. More specifically, the ACCECU 32 determines that the notification device 37 should perform notification that there is a possibility that the vehicle 10 will suffer a collision, or notification that prompts the driver to step on the brake pedal.

As described above, the ACCECU 32 determines that the notification information related to safety is to be notified with priority than the notification information related to the driving method. That is, in a case where the vehicle 10 is not in a safe state, the ACCECU 32 makes the priority of the notification information related to the safety higher than the notification information related to driving method.

Note that in the process illustrated in step S11, an index value that may be calculated from the relative distance and the relative speed of the preceding vehicle may be used instead of the relative distance and the relative speed of the preceding vehicle.

After executing the process of step S12, as the process of step S14, the ACCECU 32 transmits the notification information set in the process of step S12 to the HMIECU 33. In this case, the HMIECU 33, via the notification device 37, performs a notification that there is a possibility that the vehicle 10 will suffer a collision, or a notification to step on the brake pedal.

On the other hand, in a case where the relative distance of the preceding vehicle is longer than the first distance threshold value Dth1 and the relative speed of the preceding vehicle is faster than the first speed threshold value Vth1, the ACCECU 32 determines in the process of step S11 that the vehicle 10 is in a safe state. In other words, the ACCECU 32 determines that the vehicle 10 is in a safe state in a case where the relative distance of the preceding vehicle is larger than the first distance threshold value Dth1 and the relative speed of the preceding vehicle is larger than the first speed threshold value Vth1. In a case where the vehicle 10 is in a safe state, the ACCECU 32 makes the priority of the notification information related to driving method higher than the notification information related to the safety. In this case, the ACCECU 32 makes an affirmative determination in the process of step S11, and determines in the process of the next step S13 whether the traveling of the vehicle 10 is in an unnatural state. An unnatural traveling state of the vehicle 10 is a state in which, as a result of the driver of the vehicle 10 driving according to a driving method that is notified by the notification device 37 in the process of step S14 that will be described later, an inter-vehicle distance between the vehicle 10 and the preceding vehicle becomes non-ideal. The unnatural traveling state of the vehicle 10 is in a non-ideal traveling state, or in other words the unnatural traveling state means a state in which is not an ideal traveling state kept at a constant inter-vehicle distance. More specifically, in a case where the relative distance of the preceding vehicle is equal to or less than the second distance threshold value Dth2, or the relative speed of the preceding vehicle is equal to or less than the second speed threshold value Vth2, the ACCECU 32 determines that the traveling state of the vehicle 10 is not unnatural. In other words, the ACCECU 32 determines that the vehicle 10 is in an ideal traveling state in a case where the relative distance of the preceding vehicle is equal to or less than the second distance threshold value Dth2. The ACCECU 32 determines that the vehicle 10 is in an ideal traveling state in a case where the relative speed of the preceding vehicle is a positive value and the relative speed of the preceding vehicle is equal to or less than the second speed threshold value Vth2. Note that the second distance threshold value Dth2 is set to a value larger than the first distance threshold value Dth1. Moreover, the second speed threshold value Vth2 is set to a value larger than the first speed threshold value Vth1. In this case, the ACCECU 32 makes a negative determination in the process of step S13, and executes the process of step S14.

Figure 3:
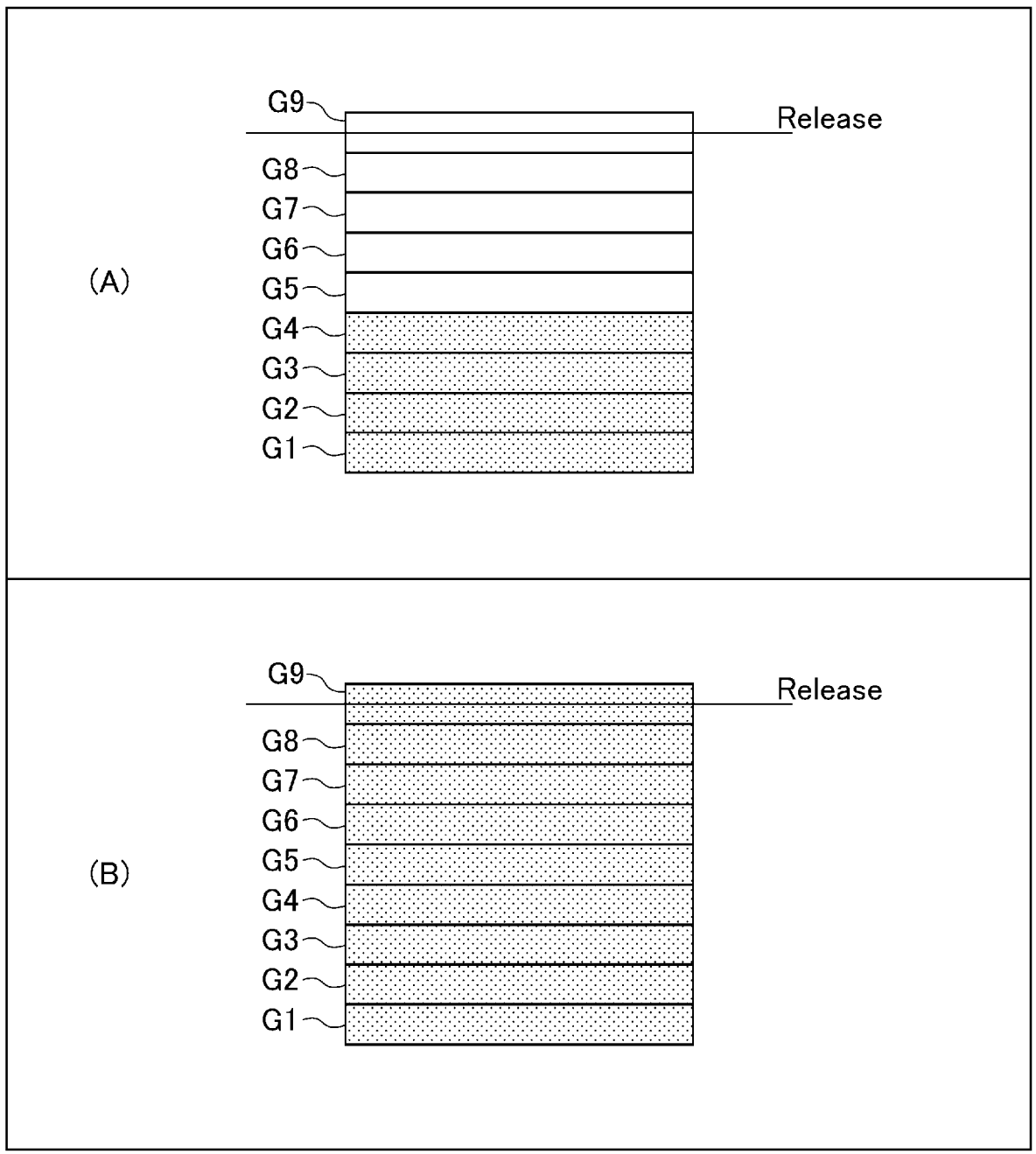
FIG. 3 is a diagram illustrating display examples for allowing the driver to recognize the release timing of the accelerator pedal.

As the process in step S14, the ACCECU 32 determines to perform notification by the notification device 37 of information related to the driving method for improving the electric power consumption of the vehicle 10. More specifically, the ACCECU 32, based on the behavior of the surrounding vehicles, calculates optimal release timing for releasing the accelerator pedal in order to reduce the electric power consumption of the vehicle 10, and instructs the HMIECU 33 to display via the notification device 37 the calculated release timing as visual information as illustrated in FIG. 3. As illustrated in FIG. 3, the notification device 37 displays images of a plurality of gauges G1 to G9. After calculating the release timing of the accelerator pedal, the ACCECU 32 sequentially turns ON the gauges G1 to G9 from a point in time that is a predetermined time before the release timing. The ACCECU 32 sequentially turns ON the gauges G1 to G9 in an order as illustrated in FIG. 3 (A) so that the timing of turning ON the gauge G9 coincides with the release timing of the accelerator pedal. Then, as illustrated in FIG. 3 (B), when the driver releases the accelerator pedal at the timing when the gauge G9 is turned ON, the electric power consumption of the vehicle 10 maybe reduced most.

Figure 4:
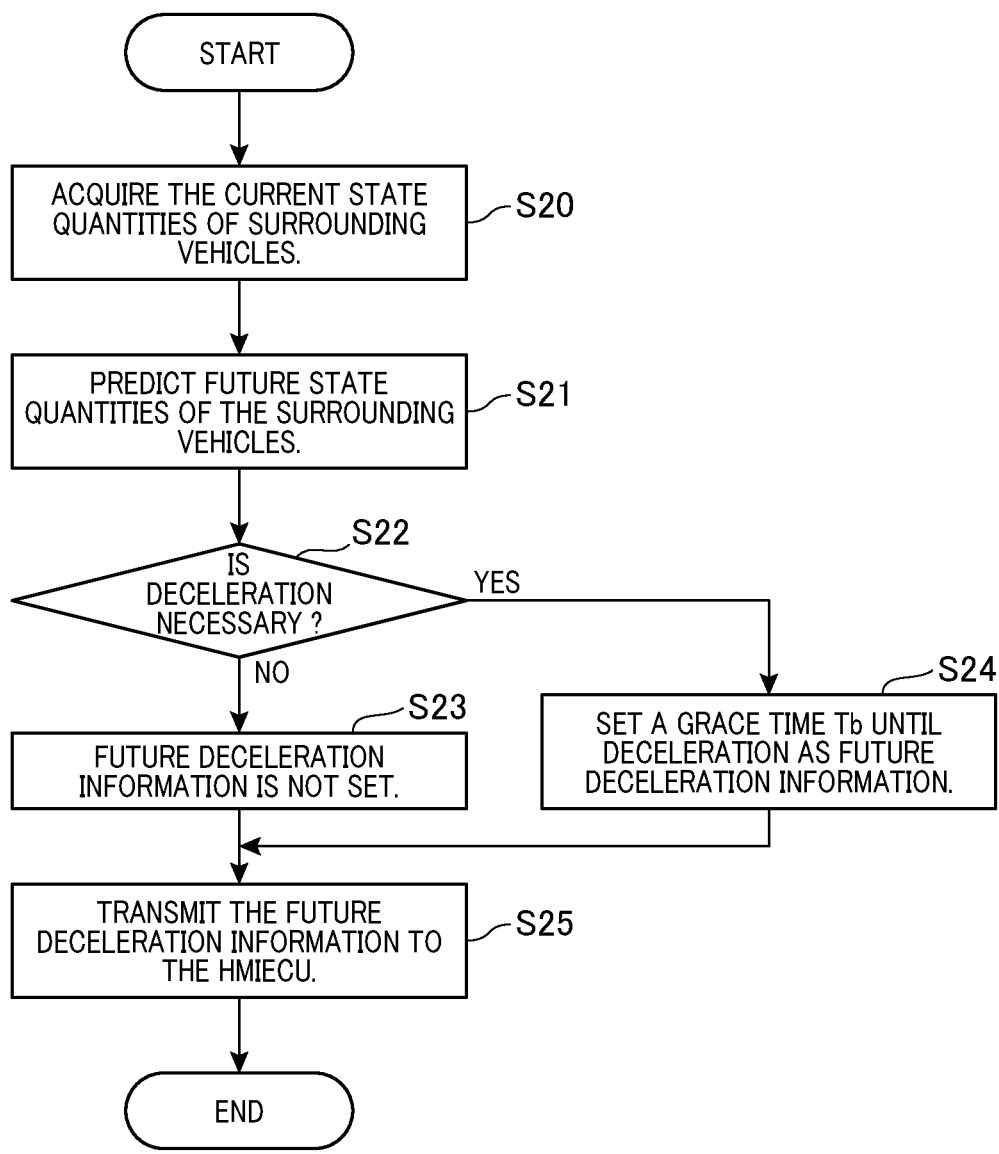
FIG. 4 is a flowchart illustrating a procedure of processing executed by an ACCECU according to a first embodiment.

Note that the ACCECU 32 calculates the optimal accelerator pedal release timing for reducing the electric power consumption of the vehicle 10 by executing the processing illustrated in FIG. 4. As illustrated in FIG. 4, the ACCECU 32, first, in the process of step S20, acquires the current state quantities of the surrounding vehicles using the millimeter wave radar device 35 and the imaging device 36. The current state quantities of the surrounding vehicles include a relative distance, a relative speed, a relative acceleration, and the like of the surrounding vehicles.

The ACCECU 32, as the process of step S20 and the next step S21, predicts future state quantities of the surrounding vehicles including the preceding vehicle and adjacent traveling vehicles. The predicted state quantities of the surrounding vehicles include time-series data and the like of the future relative position, relative distance, relative speed, and relative acceleration of the surrounding vehicles. More specifically, the ACCECU 32, using an arithmetic expression, a model, or the like, predicts future state quantities of the surrounding vehicles from the present time until after a specified amount of time has elapsed. Accordingly, the ACCECU 32 is able to predict the behavior of the surrounding vehicles from the present time until after a specified time has elapsed.

Note that the prediction process in step S21 may be executed based on information related to other state quantities of the surrounding vehicles and is not limited to the current and past values of the state quantities of the surrounding vehicles. This prediction may predict the behavior of surrounding vehicles as a time-series waveform using a predetermined probability model based on past vehicle travel data, or may statistically process travel data of a vehicle that has traveled in the past at a current location, and calculate the deceleration or interruption probability of a vehicle at a certain location. The predicted time is a time required to reach any vehicle speeds obtained by acceleration during normal driving. For example, the range of the acceleration may be set to a range of "−1 [G]" to "1 [G]", and the range of the vehicle speed may be set to a range of "0 [km/h]" to a legal vehicle speed limit.

The ACCECU 32, as the process of step S21 and the next step S22, determines whether it is necessary to cause the vehicle 10 to decelerate based on the behavior of the surrounding vehicles. This determination process is specifically executed by the following method.

A case is presumed in which there are N surrounding vehicles, and when a value i is defined as an integer in the range of $1 \leq i \leq N$, the vehicle 10 has a specified state quantity b(t) with respect to the traveling of the i-th surrounding vehicle. The state quantity b(t) is, for example, a function of speed with time t as a variable. It is presumed that when the vehicle 10 travels with the state quantity b(t), the braking energy generated in the vehicle 10 may be represented by $E_{brk\ i}(b(t))$, where $E_{brk\ i}(b(t))$ is a predicted value of the braking energy generated when the vehicle 10 is caused to decelerate during the period from the present to until after a specified time has elapsed.

Figure 5:
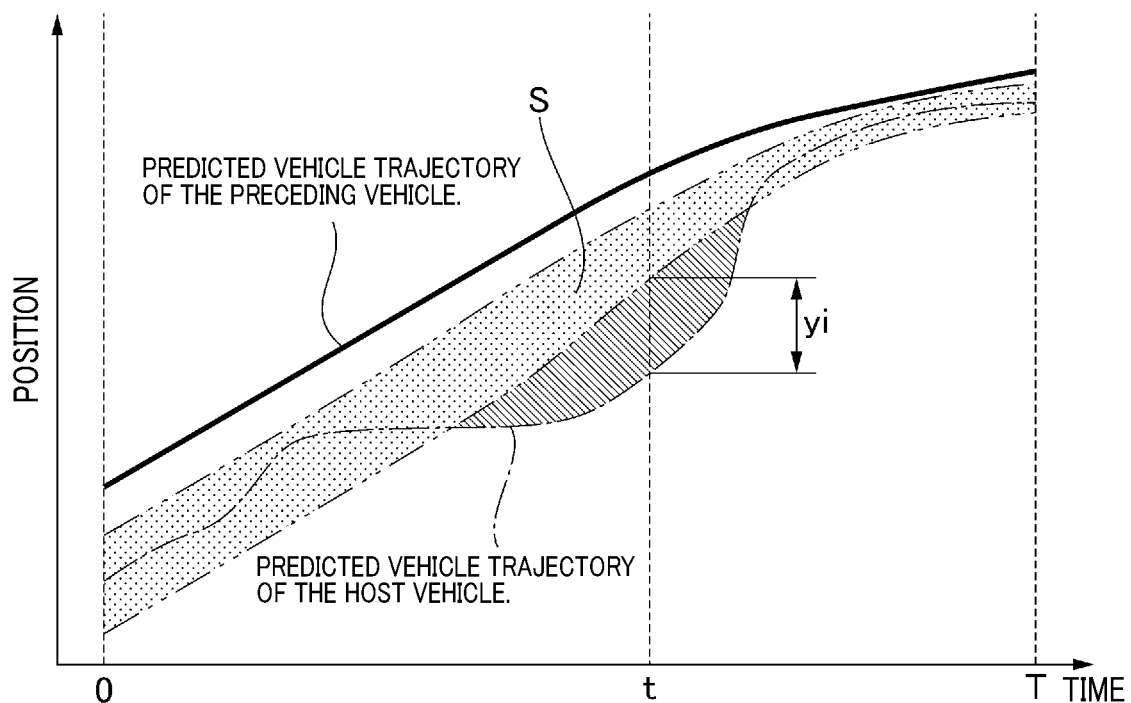
FIG. 5 is a graph illustrating an example of a method of calculating a deviation amount of a host vehicle from an ideal traveling range by an ACCECU according to a first embodiment.

Moreover, as illustrated in FIG. 5, presuming that the range of the ideal inter-vehicle distance for causing the vehicle 10 to follow the preceding vehicle in a safe state is the ideal traveling range (ideal inter-vehicle distance range) S, the performance of the following traveling of the vehicle 10 with respect to the i-th surrounding vehicle may be evaluated based on a deviation $y_i$ of the predicted position of the vehicle 10 with respect to the ideal traveling range S in a period from the present until after a specified time has elapsed. The ideal traveling range S is set based on the predicted traveling position of the i-th surrounding vehicle indicated by a dashed line, and may be found from the predicted traveling position of the surrounding vehicle using an arithmetic expression or the like. The performance evaluation value $C_i(b(t))$ of the following traveling of the vehicle 10 may be found by the following equation f1 using the deviation $y_i$ of the predicted position of the vehicle 10 with respect to the ideal traveling range S. Note that "T" in equation f1 is a predicted time.

[Math. 1]

$$C_i(b(t)) = \int_0^T y_i(b(t))dt \tag{f1}$$

As described above, the expected value $E_{brk}(b(t))$ of the braking energy of the host vehicle with respect to the N surrounding vehicles and the expected value $C(b(t))$ of the performance evaluation value of the following traveling may be defined by the following equations f2 and f3.

[Math. 2]

$$E_{brk}(b(t)) = \sum_{i=1}^{N} p_i E_{brki}(b(t)) \tag{f2}$$

$$C(b(t)) = \sum_{i=1}^{N} p_i C_i(b(t)) \tag{f3}$$

Figure 6:
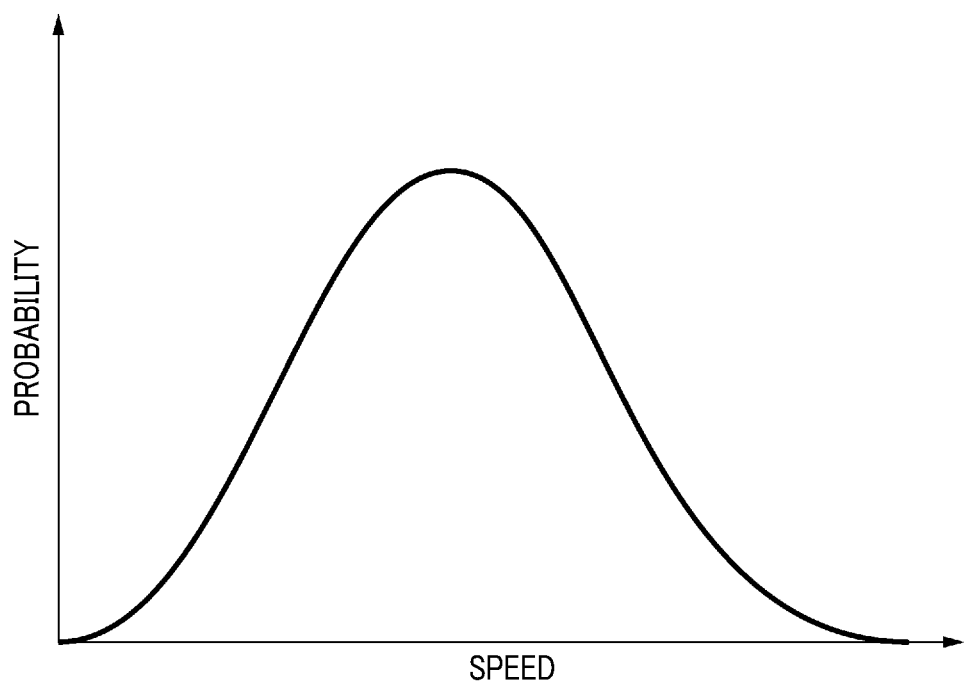
FIG. 6 is a graph illustrating a relationship between the vehicle speed and a probability used by an ACCECU according to a first embodiment.

Note that "$p_i$" in the equations f2 and f3 is the occurrence probability of the behavior of the i-th surrounding vehicle. Specifically, taking into consideration the fact that the predicted result of the behavior of the i-th surrounding vehicle includes a specified uncertainty, in the present embodiment, when the vehicle 10 travels with the state quantity b(t), the probability $p_i$ is used as a parameter indicating the likelihood that the state quantity of the i-th surrounding vehicle will occur. For example, the vehicle speed of the i-th surrounding vehicle at a specified time may be represented as a probability as illustrated in FIG. 6.

By using the expected value $E_{brk}(b(t))$ of the braking energy of the host vehicle and the expected value $C(b(t))$ of the performance evaluation value of the following traveling that are described above, an evaluation function $F_{E1}$ such as represented by the following equation f4 may be configured.

[Math. 3]

$$F_{E1} = \min\{kE_{brk}(b(t)) + (1-k)C(b(t))\} \quad (f4)$$
$$= \min \sum_{i=1}^{n} p_i \left\{ kE_{brki}(b(t)) + (1-k) \int_0^T y_i(b(t))dt \right\}$$

Note that "k" in the equation f4 is a weighting coefficient for both the braking energy and the performance evaluation value of the following traveling. The coefficient k is a value set in a range of 0≤k≤1. In the present embodiment, a predetermined value is used as the weighting coefficient.

In a case where the state quantity b(t) of the vehicle 10 is determined so that the value of the evaluation function $F_{E1}$ is minimized, the state quantity b(t) of the vehicle 10 in which the braking energy is suppressed while the performance of the following traveling is ensured may be found. In other words, it is possible to find the state quantity b(t) of the vehicle 10 that may improve the electric power consumption while performing adaptive cruise control.

Based on the method described above, the ACCECU 32 executes a determination process in step S22 illustrated in FIG. 4. More specifically, the ACCECU 32 uses, for example, an arithmetic expression found in advance by experiment or the like as the arithmetic expression of the braking energy $E_{brk\ i}(b(t))$.

In addition, the ACCECU 32 calculates a predicted traveling trajectory of the i-th surrounding vehicle from a traveling model or the like based on the predicted state quantity of the i-th surrounding vehicle in the prediction information acquired in the process of step S21. Moreover, the ACCECU 32 determines the arithmetic expression for calculating the performance evaluation value $C_i(b(t))$ of the following traveling of the vehicle 10 by finding the ideal traveling range S based on the calculated predicted traveling trajectory of the i-th surrounding vehicle.

Furthermore, the ACCECU 32 calculates the occurrence probability $p_i$ of the state quantity of the i-th surrounding vehicle based on the traveling model stored in the storage device in advance and the state quantity of the i-th surrounding vehicle.

In this way, the ACCECU 32 determines the arithmetic expression for the braking energy $E_{brk\ i}(b(t))$, the arithmetic expression for the performance evaluation value $C_i(b(t))$ of the following traveling, and the occurrence probability $p_i$ in the equation f4 above, and after that, determines the state quantity b(t) of the vehicle 10 so that the value of the evaluation function $F_{E1}$ is minimized. In minimizing the evaluation function $F_{E1}$, a plurality of different behaviors of the vehicle 10 are considered, and together with calculating the values of the evaluation function at each of these times, the state quantity b(t) of the vehicle 10 that minimizes the value of the evaluation function $F_{E1}$ may be selected from among these, or may be determined using an optimization technique. The state quantity b(t) is a function of the speed of the vehicle 10, so the ACCECU 32 is able to obtain the speed v(t) of the vehicle 10 such that the value of the evaluation function $F_{E1}$ is minimized; or in other words, so that the electric power consumption of the vehicle 10 is minimized. The speed v(t) indicates the speed of the vehicle 10 according to an elapsed time t from the present time; or in other words, indicates the speed profile of the vehicle 10.

The ACCECU 32 predicts the timing Ta when the vehicle 10 needs to decelerate based on the calculated speed v(t). For example, the ACCECU 32 determines the time t at which the acceleration, which is the time derivative of the speed v(t), becomes a negative value to be the deceleration timing Ta. In a case where there is deceleration timing Ta, the ACCECU 32 makes an affirmative determination in the process of step S22 illustrated in FIG. 4, and then in the process of the next step S24, calculates a grace time Tb before the vehicle 10 needs to be decelerated from the deceleration timing Ta, and sets the calculated grace time Tb as future deceleration information. The grace time Tb that is set as the future deceleration information corresponds to an optimal accelerator pedal release timing for reducing the electric power consumption of the vehicle 10. On the other hand, in a case where there is no deceleration timing Ta, the ACCECU 32 makes a negative determination in the process of step S22, and as the process of step S23, does not set any information as the future deceleration information of the vehicle 10. Therefore, in this case, the accelerator pedal release timing is not set.

After executing the process of step S23 or the process of step S24, as the process of step S25, the ACCECU 32 transmits the set future deceleration information to the HMIECU 33.

As illustrated in FIG. 2, after executing the process of step S14, as the process of step S16, the ACCECU 32 transmits the notification information set in the process of step S14 to the HMIECU 33. In this case, the HMIECU 33 turns ON the gauges G1 to G9 of the notification device 37 illustrated in FIG. 3 based on the future deceleration information transmitted from the ACCECU 32 in the process of step S24 in FIG. 4. More specifically, in a case where the grace time Tb is included in the future deceleration information, the HMIECU 33 sequentially turns ON the gauges G1 to G9 so that the gauge G9 is turned ON after the grace time Tb has elapsed. On the other hand, in a case where the future deceleration information does not include the grace time Tb, the HMIECU 33 does not turn ON the gauges G1 to G9.

On the other hand, when the driver is in a state of driving the vehicle 10 according to the driving method notified via the notification device 37 in the process of step S13, the ACCECU 32 determines that the traveling of the vehicle 10 is unnatural in a case where the relative distance of the preceding vehicle becomes longer than a second distance threshold value Dth2 and the relative speed of the preceding vehicle becomes faster than a second speed threshold value Vth2. In other words, the ACCECU 32 determines that the vehicle 10 is in a non-ideal traveling state in a case where the relative distance of the preceding vehicle is larger than the second distance threshold value Dth2 and the relative speed of the preceding vehicle is larger than the second speed threshold value Vth2. In this case, the ACCECU 32 makes an affirmative determination in the process of step S13, and in the process of the next step S15, determines to use the information related the driving instructions as the notification information. For example, the ACCECU 32 determines to perform notification via the notification device 37 for causing the occupant to recognize that the traveling of the vehicle 10 is temporarily unnatural (non-ideal state) in order that driving of the vehicle 10 is performed based on driving instructions for improving electric power consumption.

After executing the process of step S15, as the process of step S16, the ACCECU 32 transmits the notification information set in the processing in step S15 to the HMIECU 33.

In this case, the HMIECU 33, via the notification device 37, performs notification that the running of the vehicle 10 is temporarily unnatural in order to improve the electric power consumption of the vehicle 10.

According to the notification system 30 for the vehicle 10 of the present embodiment described above, the following operations and effects (1) to (3) may be obtained.

(1) In the process of step S11 illustrated in FIG. 2, the ACCECU 32 determines which of the notification information related to safety and the notification information related to the driving method is to be notified with priority. More specifically, in a case where the relative distance of the preceding vehicle is equal to or less than the first distance threshold value Dth1, or in a case where the relative speed of the preceding vehicle is equal to or less than the first speed threshold value Vth1, the ACCECU 32 makes the priority of the notification information related to safety higher than the notification information related to the driving method. In addition, in a case where the relative distance of the preceding vehicle is longer than the first distance threshold value Dth1 and when the relative speed of the preceding vehicle is faster than the first speed threshold value Vth1, the ACCECU 32 makes the priority of the notification information related to driving method higher than the notification information related to the safety. As described above, the ACCECU 32 functions as a priority setting unit that sets the priority of a plurality of items of notification information. The notification device 37, based on the priority set by the ACCECU 32, notifies the occupant of the vehicle 10 of the notification information related to safety or the notification information related the driving method. According to this kind of a configuration, the priority of each notification information is set based on information about the surrounding of the vehicle 10, so high-priority notification information corresponding to information about the surroundings of the vehicle 10 is notified to the occupant of the vehicle 10. Therefore, more appropriate notification information may be transmitted to the occupant of the vehicle 10.

(2) The notification information includes safety ensuring information for notifying the occupant of the vehicle 10 to ensure the safety of the vehicle 10. In a case where a negative determination is made in the process of step S11 illustrated in FIG. 2, or in other words, in a case where it is determined that notification of the safety ensuring information should be performed based on the information about the surrounding of the vehicle 10, the ACCECU 32 gives the highest priority to the safety ensuring information. Accordingly, with such a configuration, it becomes easy to ensure the safety of the vehicle 10.

(3) The notification information includes information related to a driving method for improving the electric power consumption of the vehicle 10. In a case where it is not determined that notification of the safety ensuring information should be performed based on the information about the surrounding of the vehicle 10, or in other words, in a case where the vehicle 10 is in a safe state, the ACCECU 32 makes the priority of the information related to driving method higher than the safety ensuring information. Accordingly, with such configuration, it becomes easy to improve the electric power consumption of the vehicle 10.

(Modification)

Next, a modification of the notification system 30 of the vehicle 10 of the first embodiment will be described.

The notification device 37 of this modification performs notification of information related to the accelerator pedal depression amount and the brake pedal depression amount instead of the accelerator pedal release timing.

More specifically, by calculating the state quantity b(t) of the vehicle 10 so as to minimize the value of the evaluation function FE1 represented Equation f4 is described above, the ACCECU 32 acquires information about the speed v(t) of the vehicle 10 that is able to minimize the electric power consumption of the vehicle 10. The ACCECU 32 calculates the depression amount A of the accelerator pedal and the depression amount B of the brake pedal from the calculated speed v(t) information. These calculations are performed, for example, as described below.

Presuming that the speed of the vehicle 10 is "v" and that the weight of the vehicle is "m", the traveling resistance of the vehicle 10 may be calculated from f(v). At this time, the driving force F(v) that is to be outputted by the vehicle 10 may be calculated by the following equation f5.

[Math. 4]

$$F(v) = f(v) + m\frac{dv}{dt} \tag{f5}$$

Based on the driving force F(v), the driving power P of the vehicle 10 may be calculated by the following equation f6.

[Math. 5]

$$P(v) = vF(v) \tag{f6}$$

By using this formula f6, the ACCECU 32 is able to calculate the driving power P of the vehicle 10 capable of minimizing the electric power consumption from the speed v(t) information of the vehicle 10 capable of minimizing the electric power consumption. Therefore, by finding an arithmetic expression A(P(t)) indicating the relationship between the accelerator pedal depression amount A and the driving power P, and an arithmetic expression B(P(t)) indicating the relationship between the brake pedal depression amount B and the driving power P beforehand by experiment or the like, the accelerator pedal depression amount A and the brake pedal depression amount B may be set as in the following equations f7 and f8 based on the driving power P that is calculated using equation f6.

[Math. 6]

$$A = \begin{cases} A(P(t)) & (P(t) \geq Pth) \\ 0 & (P(t) < Pth) \end{cases} \tag{f7}$$

$$B = \begin{cases} 0 & (P(t) \geq Pth) \\ B(P(t)) & (P(t) < Pth) \end{cases} \tag{f8}$$

Here, the threshold value Pth set for the driving power P is found beforehand by experiment or the like to determine which of the arithmetic expressions A(P(t)) or B(P(t)) should be used for the driving power P, after which the value is set as the value of the driving power P at the boundary.

The ACCECU 32 transmits information about the accelerator pedal depression amount A and the brake pedal depression amount B calculated by the equations f7 and f8 to the HMIECU 33. The HMIECU 33 performs notification via the notification device 37 of the information of the accelerator pedal depression amount A and the brake pedal depression amount B transmitted from the ACCECU 32 as visual information for example.

Accordingly, with such a configuration, it is possible to more accurately inform the driver of a driving method capable of improving the electric power consumption of the vehicle 10.

Second Embodiment

Next, a second embodiment of a notification system 30 of the vehicle 10 will be described. The following description will mainly center on the differences from the notification system 30 of the first embodiment.

The notification system 30 of the present embodiment differs from the notification system 30 of the first embodiment in that the occupant is notified of information related to the driving support control of the vehicle 10. In addition, in the ACC control, the ACCECU 32 more accurately controls the traveling of the vehicle 10 according to the behavior of the surrounding vehicles.

Specifically, in a case where the deceleration of the preceding vehicle is predicted during the execution of the ACC control, the ACCECU 32 executes a predicted deceleration control for decelerating the vehicle 10 in advance. More specifically, the ACCECU 32 determines whether the preceding vehicle has started decelerating based on the traffic information acquired via the communication device 34. For example, when the ACCECU 32 determines based on the installation location of the traffic light included in the traffic information, that the distance between the current position of the preceding vehicle and the installation location of the traffic light is equal to or less than a predetermined distance, the ACCECU 32 determines that the preceding vehicle has started decelerating. When it is determined that the preceding vehicle has started decelerating, the ACCECU 32 executes predicted deceleration control for decelerating the vehicle 10 in advance, and thereby ensures an inter-vehicle distance between the vehicle 10 and the preceding vehicle.

Moreover, in a case where the vehicle 10 may have a collision during the execution of the ACC control, the ACCECU 32 executes collision avoidance control such as forcibly decelerating or stopping the vehicle 10 in order to ensure the safety of the vehicle 10. More specifically, the ACCECU 32 acquires information about the relative distance and the relative speed of the preceding vehicle based on information that may be acquired by the millimeter wave radar device 35 and the imaging device 36. In a case where the acquired relative distance of the preceding vehicle is equal to or less than the specified first distance threshold value Dth1 and the relative speed of the preceding vehicle is equal to or less than the specified first speed threshold value Vth1, the ACCECU 32 determines that there is a possibility the vehicle 10 may collide with the preceding vehicle, and forcibly decelerates or stops the vehicle 10.

Furthermore, during execution of the ACC control, the ACCECU 32, by finding the state quantity b(t) of the vehicle 10 such that the value of the evaluation function $F_{E1}$ represented by equation f4 above is minimized, acquires information about the speed v(t) of the vehicle 10 that enables minimizing the electric power consumption of the vehicle 10. The ACCECU 32, by controlling the traveling of the vehicle 10 based on the speed v(t) information, is able to achieve traveling of the vehicle 10 that minimizes the electric power consumption. More specifically, the ACCECU 32 finds a target acceleration of the vehicle 10 by calculating a time differential value of the speed v(t), and then transmits the target acceleration to the EVECU 31 as an acceleration command value. The EVECU 31 controls the motor generator 20 via the inverter device 21 based on the acceleration command value, and thereby achieves traveling of the vehicle 10 corresponding to the speed v(t) information.

Figure 7:
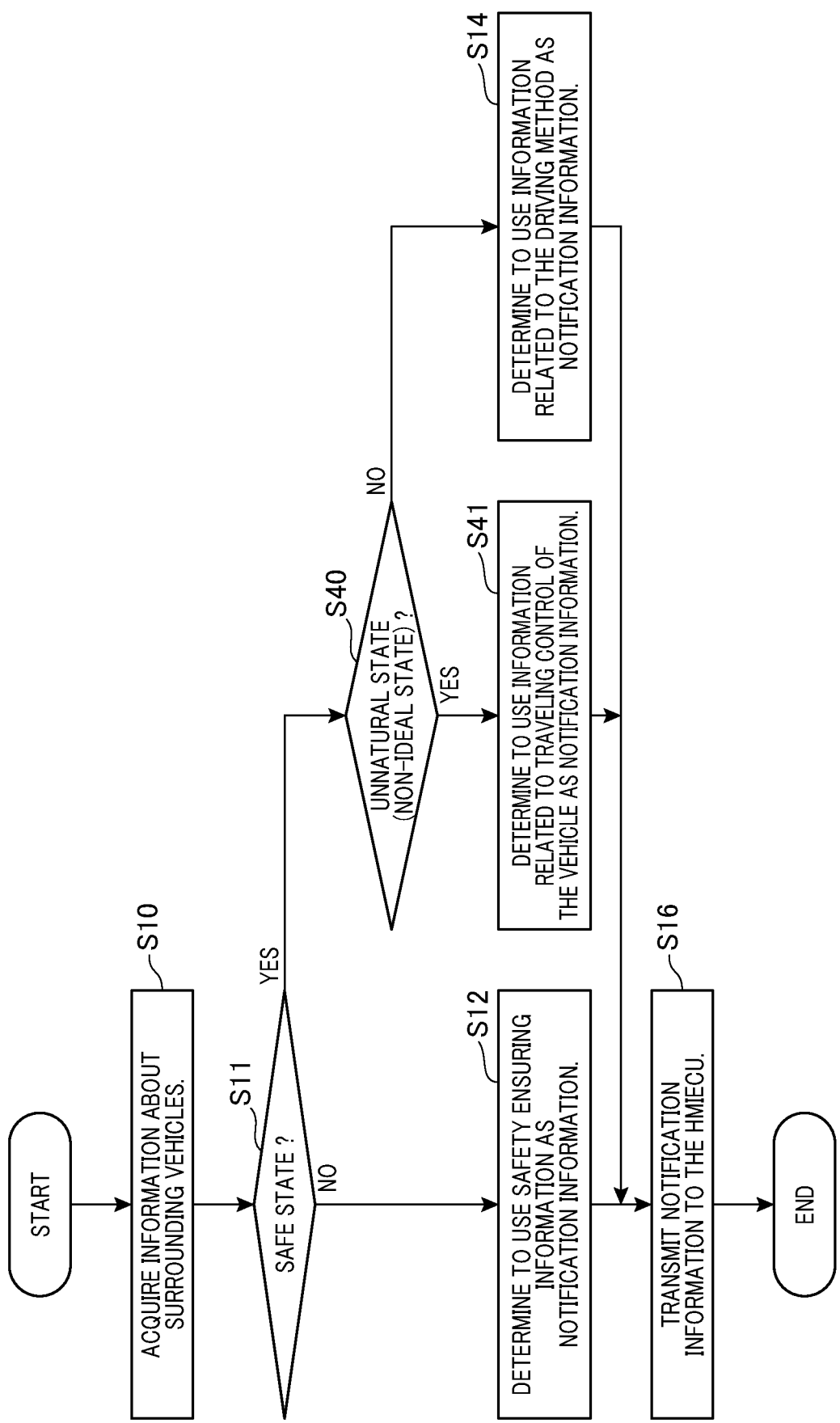
FIG. 7 is a flowchart illustrating a procedure of processing executed by an ACCECU according to a second embodiment.

On the other hand, during execution of the ACC control, the ACCECU 32 sets the priority of the notification information by repeatedly executing the processing illustrated in FIG. 7 at a specified cycle. Note that, in the processing illustrated in FIG. 7, the same processes as those illustrated in FIG. 2 are denoted by the same reference numerals, and redundant descriptions will be omitted.

As illustrated in FIG. 7, in a case where a negative determination is made in the process of step S11, or in other words, in a case where it is determined that the vehicle 10 is not in a safe state, as the process of step S12, the ACCECU 32 determines to use the safety ensuring information necessary for ensuring the safety of the vehicle 10 as the notification information. More specifically, in a case where driving support control is executed in the vehicle 10, the collision avoidance control described above is executed, so the ACCECU 32 determines to perform notification that the traveling control of the vehicle has transitioned to the collision avoidance control for ensuring safety, or determines not to perform any notification.

After executing the process in step S12, as the process of step S16, the ACCECU 32 transmits the notification information set in the process of step S12 to the HMIECU 33. In this case, the HMIECU 33, via the notification device 37, reports that the traveling control of the vehicle has transitioned to the collision avoidance control for ensuring safety, or does not perform any notification.

On the other hand, in a case where an affirmative determination is made in the process of step S11, or in other words, in a case where it is determined that the vehicle 10 is in a safe state, as the process to step S40, the ACCECU 32 determines whether the traveling of the vehicle 10 is unnatural with respect to the traveling state of the preceding vehicle. The state in which the traveling of the vehicle 10 is unnatural is a state where the relative distance between the preceding vehicle and the vehicle 10 is too large or a state where the relative speed of the preceding vehicle is too fast. When the predicted deceleration control described above is executed by the ACCECU 32, the relative distance between the preceding vehicle and the vehicle 10 increases, or the relative speed of the preceding vehicle increases, so as a result there is a possibility that the traveling state of the vehicle 10 will become unnatural. There is a possibility that the occupant of the vehicle 10 may feel uncomfortable in such a traveling state of the vehicle 10. Therefore, in a case where the traveling state of the vehicle 10 becomes unnatural in this way, the ACCECU 32 of the present embodiment is configured to notify the occupant of the vehicle 10 that the state is due to the traveling control of the vehicle, thereby reducing the discomfort of the occupant.

More specifically, in a case where the relative distance of the preceding vehicle is longer than the second distance threshold value Dth2, and the relative speed of the preceding vehicle is faster than the second speed threshold value Vth2, the ACCECU 32 determines that the traveling state of the vehicle 10 is unnatural. In other words, the ACCECU 32 determines that the traveling state of the vehicle 10 is unnatural in a case where the relative distance of the preceding vehicle is larger than the second distance threshold value Dth2 and the relative speed of the preceding vehicle is larger than the second speed threshold value Vth2. Note that the second distance threshold value Dth2 is set to a value larger than the first distance threshold value Dth1.

Moreover, the second speed threshold value Vth2 is set to a value larger than the first speed threshold value Vth1. In a case where it is determined that the traveling of the vehicle 10 is in an unnatural state, the ACCECU 32 makes an affirmative decision in the process of step S40, and in the process of the next step S41, determines to use the information related to the intention of the traveling control as the notification information. For example, the ACCECU 32 determines to perform notification via the notification device 37 to notify the occupant that predicted deceleration control is being performed.

After executing the process of step S41, as the process of step S16, the ACCECU 32 transmits the notification information set in the process of step S41 to the HMIECU 33. In this case, the HMIECU 33, via the notification device 37, performs notification that the predicted deceleration control is being executed.

On the other hand, in a case where the relative distance of the preceding vehicle is equal to or less than the second distance threshold value Dth2, or in a case where the relative speed of the preceding vehicle is equal to or less than the second speed threshold value Vth2, the ACCECU 32 determines that the traveling state of the vehicle 10 is not unnatural. In this case, the ACCECU 32 makes a negative determination in the process of step S40, and, as a process of the next step S14, determines to perform notification via the notification device 37 of information related to the driving method for improving the electric power consumption of the vehicle 10. More specifically, the ACCECU 32 determines to perform notification via the notification device 37 that the traveling control of the vehicle 10 for achieving a speed v(t) capable of minimizing the electric power consumption is being executed, or to perform notification of the speed v(t) information itself.

After executing the process in step S14, as the process in step S16, the ACCECU 32 transmits the notification information set in the process of step S14 to the HMIECU 33. In this case, the HMIECU 33, via the notification device 37, performs notification that the traveling control of the vehicle 10 for minimizing electric power consumption is being executed, or performs notification of the speed v(t) information itself as visual information.

According to the notification system 30 of the vehicle 10 of the present embodiment described above, the operations and effects indicated in (4) below may be further obtained.

(4) The notification information includes information related to the traveling control of the vehicle. In a case where the traveling of the vehicle 10 is in an unnatural state, for example, the ACCECU 32 determines to perform notification via the notification device 37 to notify the occupant that predicted deceleration control is being performed. Accordingly, it is possible to reduce the uncomfortable feeling given to the driver by automatically performing traveling control of the vehicle.

Third Embodiment

Next, a third embodiment of a notification system 30 of the vehicle 10 will be described. The following description will mainly center on the differences from the notification system 30 of the second embodiment.

The notification system 30 of the present embodiment differs from the notification system 30 of the second embodiment in that the form of notification of each item of information is changed according to the priority of each item of notification information.

Figure 8:
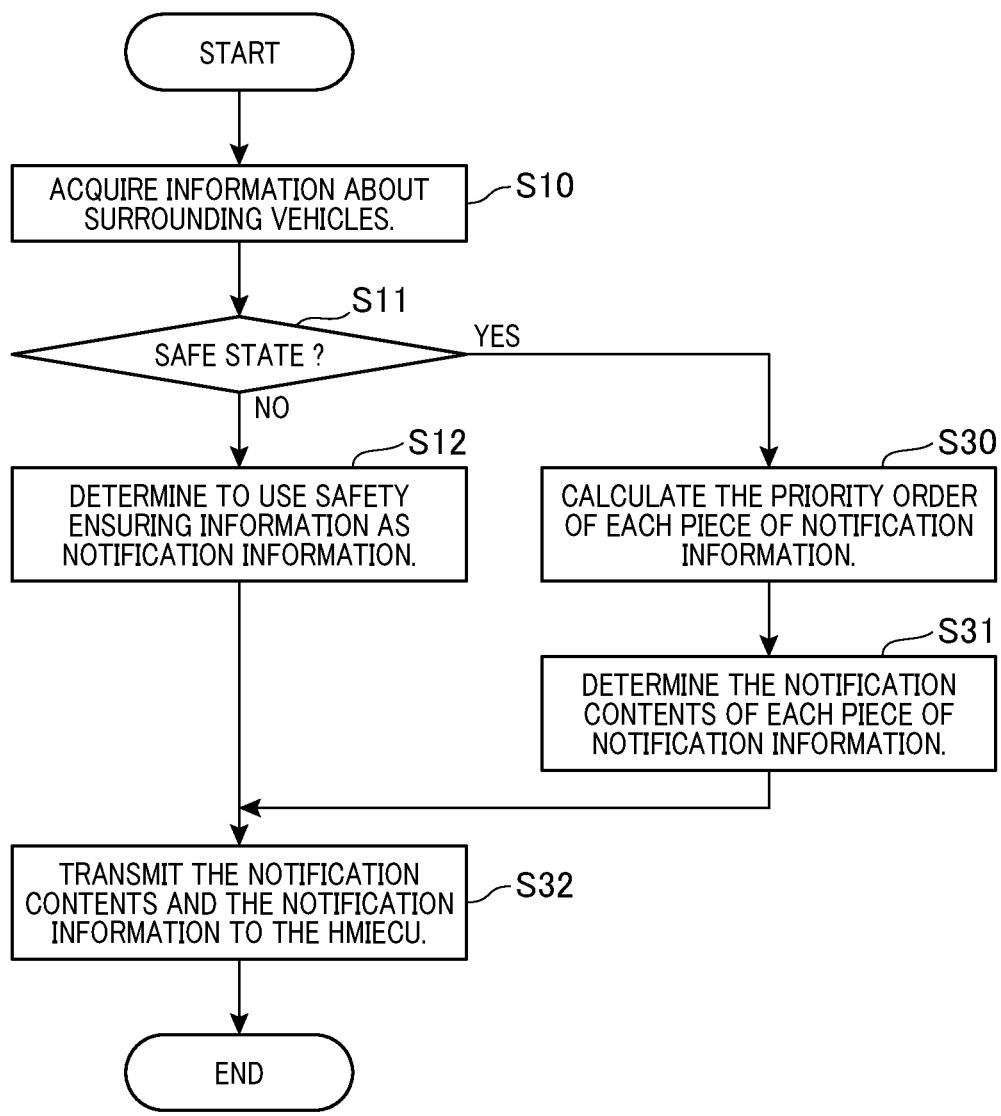
FIG. 8 is a flowchart illustrating a procedure of processing executed by an ACCECU according to a third embodiment.
Figure 9:
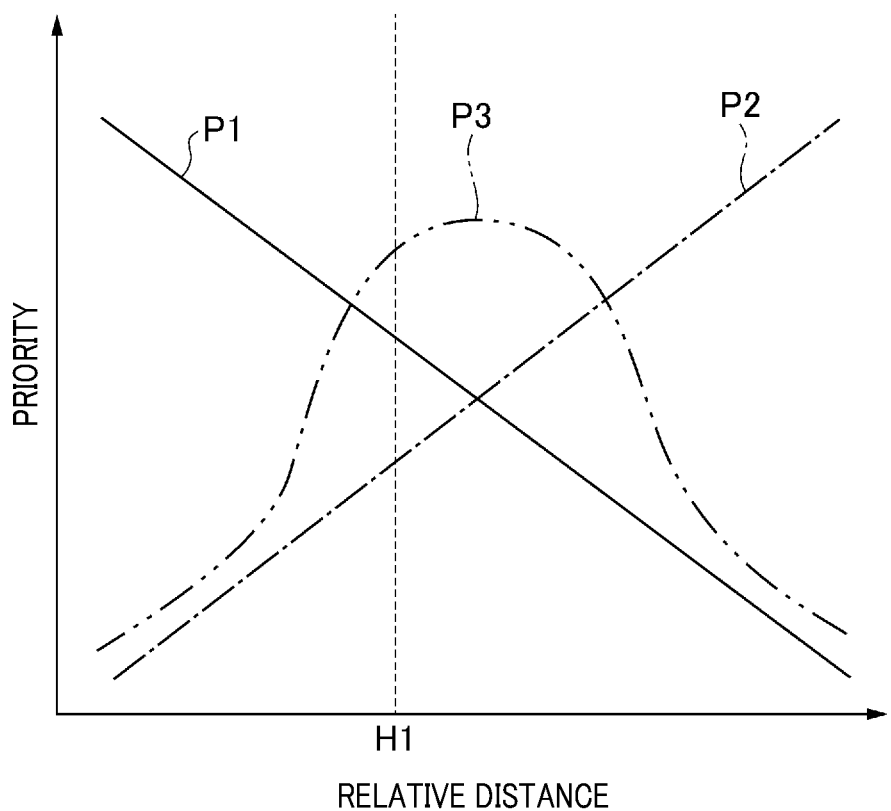
FIG. 9 is a map used by an ACCECU according to a third embodiment, and illustrates a relationship between the relative distance to a preceding vehicle and the priority of each item of notification information.

More specifically, the ACCECU 32 of the present embodiment executes the processing illustrated in FIG. 8 instead of the processing illustrated in FIG. 7. As illustrated in FIG. 8, in a case where the ACCECU 32 makes an affirmative determination in the process of step S11, or in other words, in a case where it is determined that the vehicle 10 is in a safe state, the ACCECU 32, as the process of step S30, calculates the priority order of each item of notification information. More specifically, the ACCECU 32 calculates the priority order of each item of notification information using the map shown in FIG. 9. The map illustrated in FIG. 9 illustrates the relationship between the relative distance between the vehicle 10 and the preceding vehicle on the horizontal axis, and the priority P1 to P3 of each item of notification information on the vertical axis. In the map illustrated in FIG. 9, the priority P1 of the notification information related to safety is indicated by a solid line, the priority P2 of the notification information related to the intention of traveling control is indicated by a one-dot chain line, and the priority P3 of the notification information related to the driving method for improving the electric power consumption of the vehicle 10 is indicated by a two-dot chain line.

As indicated by the solid line in FIG. 9, the priority P1 of the notification information related to safety is set so as to decrease as the relative distance to the preceding vehicle increases. Moreover, as indicated by the one-dot chain line in FIG. 9, the priority P2 of the notification information related to the intention of the traveling control is set to increase as the relative distance to the preceding vehicle increases. Furthermore, as illustrated by the two-dot chain line in FIG. 9, the priority P3 of the notification information related to the driving method for improving the electric power consumption of the vehicle 10 is set such that the relative distance to the preceding vehicle is the highest in the middle range. The ACCECU 32 calculates the priority P1 to P3 of each item of notification information from the relative distance between the vehicle 10 and the preceding vehicle using the map illustrated in FIG. 9.

As illustrated in FIG. 8, as the process of step S30 and the process of the next step S31, the ACCECU 32 determines the notification content of each item of notification information.

More specifically, in a case where the driver is manually driving the vehicle 10, the ACCECU 32 determines to perform notification via the notification device 37 of information that there is a possibility that the vehicle 10 may collide, or information prompting the driver to depress the brake pedal as notification information related to safety. In addition, in a case where the driving support control of the vehicle 10 is being executed, the ACCECU 32 determines to perform notification that the traveling control of the vehicle has transitioned to collision avoidance control for ensuring safety as the notification information related to safety.

On the other hand, the ACCECU 32 determines to perform notification via the notification device 37 to notify the occupant that predicted deceleration control is being performed as notification information related the intention of the traveling control.

Furthermore, in a case where the driver is manually driving the vehicle 10, the ACCECU 32 determines to display the optimal accelerator pedal release timing for reducing the electric power consumption of the vehicle 10 as the notification information related to the driving method for improving the electric power consumption of the vehicle 10, and to display the information via the notification device 37 as visual information such as illustrated in FIG. 3. Moreover, in a case where the driving support control of the vehicle 10 is being executed, the ACCECU 32 determines to perform notification via the notification device 37 that traveling control of the vehicle 10 for achieving the speed v(t) capable of minimizing electric power consumption is being performed, or notification of the speed v(t) information itself as notification information related to a driving method for improving the electric power consumption of the vehicle 10.

Figure 10:
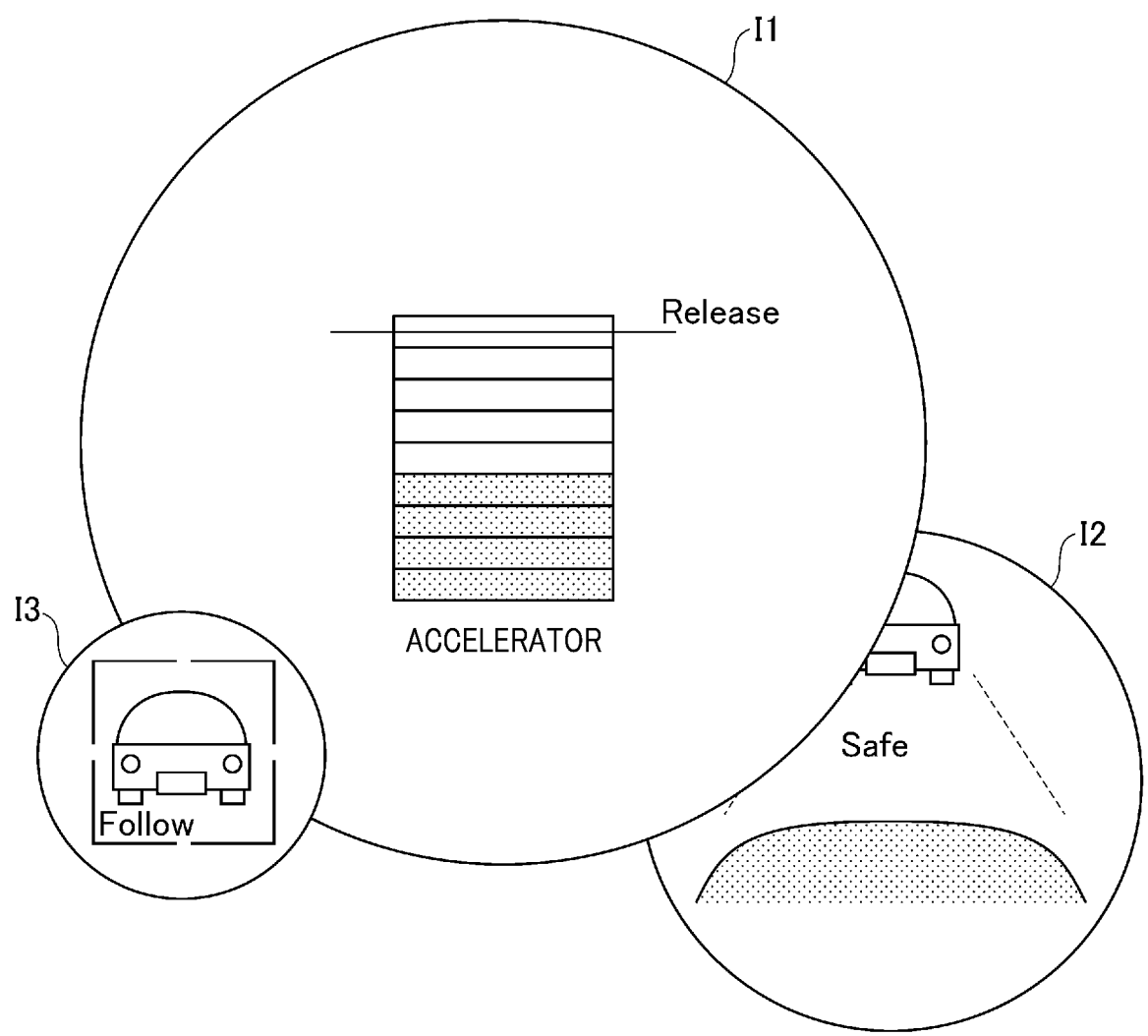
FIG. 10 is a diagram illustrating an example of a form of notification by a notification device according to a third embodiment.

The ACCECU 32, as the process of step S31 and the next step S32, transmits the form of notification of each item of notification information together with the notification contents of each item of notification information determined in step S31 to the HMIECU 33. The ACCECU 32, as a form of notification of each item of notification information, instructs the HMIECU 33 to display the notification such that the notification information with a higher priority is displayed larger. For example, in a case where the relative distance to the preceding vehicle is "H1" as illustrated in FIG. 9, the priority P1 to P3 of each item of notification information is set so as to satisfy the relationship of P3>P1>P2. In this case, as illustrated in FIG. 10, the ACCECU 32 instructs the HMIECU 33 to maximize the image I1 of the notification information related to the driving method for improving the electric power consumption of the vehicle 10, and to reduce the display in the order of image I2 of the notification information related to safety, and image I3 of the notification information related to the intention of the driving control. Accordingly, the HMIECU 33 displays an image as illustrated in FIG. 10 on the notification device 37.

On the other hand, as illustrated in FIG. 8, in a case where the ACCECU 32 makes a negative determination in the process of step S11, or in other words, in a case where it is determined that the vehicle 10 is in a safe state, the ACCECU 32, as the process of step S12, determines to use safety ensuring information for ensuring the safety of the vehicle 10 as the notification information. In this case, as the process in the next step S32, the ACCECU 32 instructs the HMIECU 33 to display only the safety ensuring information. Accordingly, the HMIECU 33 performs notification via the notification device 37 of only the safety ensuring information.

According to the notification system 30 of the vehicle 10 of the present embodiment described above, the operations and effects described in (5) and (6) below may be further obtained.

(5) The notification device 37 changes the form of notification such that notification information having a higher priority among a plurality of items of notification information becomes easier for the driver to recognize. Accordingly, with such a configuration, more important information may be more easily recognized by the driver.

(6) As a change to the form of notification, the form of transmission of notification information to the driver's vision is changed as illustrated in FIG. 10, and the notification device 37 changes the form of notification so that of the plurality of items of notification information, information having a higher priority is displayed with improved visibility. Accordingly, with such a configuration, the driver may more reliably be made aware of the high-priority notification information.

Other Embodiments

Note that each of the embodiments may be also be implemented in the forms described below.

Figure 11:
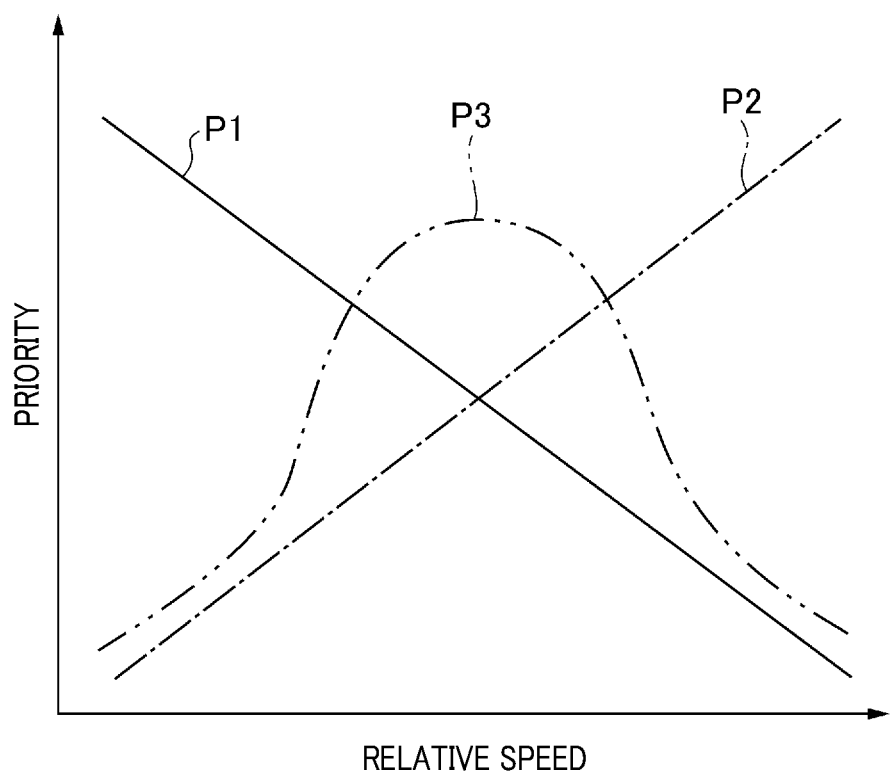
FIG. 11 is a map used by an ACCECU according to another embodiment, and illustrates a relationship between the relative speed with respect to a preceding vehicle and the priority of each item of notification information.

The ACCECU 32 of the third embodiment, instead of using the map illustrated in FIG. 9, may use a map such as illustrated in FIG. 11, or in other words, may use a map that indicates the relationship between the relative speed between the vehicle 10 and the preceding vehicle and the priority P1 to P3 of each of the items of notification information.

The notification device 37 of the third embodiment, as a method of changing the visibility according to the priority of each item of notification information, may instead of changing the size of each item of notification information, change the color, the design, or the like.

The notification device 37 according to the third embodiment is not limited to changing visibility in accordance with the priority of each item of notification information, and may change the form of transmission to the driver's five senses or the brain. In this case, the notification device 37 may change the form of notification such that of a plurality of items of notification information, information having a higher priority provides a stronger stimulation to the driver's five senses or the brain. As a form of transmission to the five senses, sound, smell, or the like may be used. Moreover, in a situation where the priority of the notification information related to safety is high, a method such as vibrating the steering wheel or the seat of the vehicle 10, applying an electric current to the steering wheel or the seat, tightening the seat belt, giving a reaction force to the accelerator pedal or the brake pedal, or the like may be used.

In the process of step S11 illustrated in FIG. 2, FIG. 7, and FIG. 8, whether the vehicle 10 is safe may also be determined based on not only the preceding vehicle, but also the relative distance, the relative speed or the like between the vehicle 10 and surrounding vehicles existing around the vehicle 10. Moreover, in the process of step S11, whether the vehicle 10 is safe may also be determined based on a relative distance, a relative speed, and the like between the vehicle 10 and an object excluding surrounding vehicles.

Notification performed by the notification device 37 may be performed not only for the occupant of the vehicle 10 but also for an administrator who manages the vehicle outside the vehicle 10. More specifically, by transmitting notification information from the vehicle 10 to a management device operated by an administrator, various notifications are performed from the notification unit of the management device to the administrator.

The ACCECU 32 is not limited to executing the ACC control for controlling the traveling of the vehicle 10 so as to follow the preceding vehicle, and for example, may be configured to execute so-called automatic driving, in which the vehicle 10 is automatically driven based on information that may be acquired by the millimeter wave radar device 35 or the imaging device 36.

The configuration of each embodiment is not limited to an electric automobile, and may also be applied to an automobile driven based on the power from an internal combustion engine. By applying the configuration of each embodiment to such an automobile, it is possible to improve fuel consumption instead of electric power consumption.

The ECUs 32, 33 and control methods thereof may be achieved by one or a plurality of dedicated computers provided by configuring a processor and memory programmed so as to execute one or a plurality of functions embodied by a computer program. The ECUs 32, 33 and the control methods thereof described in the present disclosure may be achieved by a dedicated computer provided by configuring a processor including one or a plurality of dedicated hardware logic circuits. The ECUs 32, 33 and the control methods thereof described in the present disclosure may be achieved by one or a plurality of dedicated computers configured by a combination of a program, a memory and processor including one or a plurality of hardware logic circuits and programmed so as to execute one or a plurality of functions. The computer program may be stored in a computer-readable non-transitory tangible recording medium as instructions to be executed by a computer. The dedicated hardware logic circuit and the hardware logic circuit may be achieved by a digital circuit including a plurality of logic circuits, or an analog circuit.

The present disclosure is not limited to the specific examples described above. Examples in which a person skilled in the art appropriately changes the design of the above specific examples may also be included in the scope of the present disclosure as long as the features of the present disclosure are provided. The elements included in each of the specific examples described above, and arrangement, conditions, shapes, and the like thereof are not limited to those illustrated, but may be appropriately changed. The elements included in each of the specific examples described above may be appropriately changed in combination as long as no technical inconsistency occurs.

What is claimed is:

1. A vehicle notification system, comprising:
   a surrounding information acquiring unit for acquiring surrounding information of a vehicle;
   a priority setting unit for setting priority of a plurality of items that include notification information based on the surrounding information of the vehicle; and
   a notification unit for performing notification of at least one item selected from a plurality of items of notification information to a notification target person based on the priority set by the priority setting unit, wherein:
   the priority setting unit is configured to:
      determine whether the vehicle is in a safe state based on the surrounding information of the vehicle;
      make a priority of the notification information related to a driving method higher than a priority of the notification information related to safety in response to determining that the vehicle is in the safe state; and
      make the priority of the notification information related to the safety higher than the notification information related to the driving method in response to determining that the vehicle is not in the safe state.

2. The vehicle notification system according to claim 1, wherein
   the notification information includes safety ensuring information for notifying the notification target person in order to ensure the safety of the vehicle; and
   the priority setting unit sets the safety ensuring information to a highest priority in a case where, based on the surrounding information of the vehicle, it is determined that notification of the safety ensuring information should be performed.

3. The vehicle notification system according to claim 1, wherein the notification information includes driving method information for improving fuel consumption or electric power consumption of the vehicle.

4. The vehicle notification system according to claim 1, wherein the notification information includes information related to traveling control or driving instructions of the vehicle.

5. The vehicle notification system according to claim 1, wherein
   the surrounding information acquiring unit acquires as the surrounding information of the vehicle, a relative distance or a relative speed between the vehicle and a nearby vehicle existing near the vehicle; and
   the priority setting unit sets the priority based on the relative distance, the relative speed, or an index value calculated based on the relative distance or the relative speed.

6. The vehicle notification system according to claim 1, wherein
   the surrounding information acquiring unit acquires as the surrounding information of the vehicle, a relative distance or a relative speed between the vehicle and an object other than a nearby vehicle existing near the vehicle; and
   the priority setting unit sets the priority based on the relative distance, the relative speed, or an index value calculated based on the relative distance or the relative speed.

7. The vehicle notification system according to claim 1, wherein the notification unit changes a form of notification of a plurality of items of the notification information so that higher priority notification information may be more easily recognized by the notification target person.

8. The vehicle notification system according to claim 7, wherein the notification unit, as a change in the form of notification, changes a form of transmission to five senses or a brain of the notification target person, wherein, the notification unit changes the form of transmission of a plurality of items of the notification information so that higher priority notification information is provided to the five senses or brain of the notification target person with a stronger stimulation.

9. The vehicle notification system according to claim 7, wherein the notification unit, as a change in the form of notification, changes a form of transmission to the notification target person to a visual notification, wherein the notification unit changes the form of transmission of a plurality of items of the notification information so that higher priority notification information has higher visibility.

10. The vehicle notification system according to claim 1, wherein the notification target person includes a driver of the vehicle.

11. The vehicle notification system according to claim 10, wherein the notification unit performs the notification when a driver is manually driving the vehicle.

12. The vehicle notification system according to claim 1, wherein the notification target person includes a manager that manages the vehicle from outside the vehicle.

13. The vehicle notification system according to claim 1, wherein
   the priority setting unit is configured to determine that the vehicle is not in the safe state in a case where a relative distance of a preceding vehicle is equal to or less than a first distance threshold value, or in a case where a relative speed of the preceding vehicle is equal to or less than a first speed threshold value.

14. The vehicle notification system according to claim 1, wherein
   the priority setting unit is configured to:
      determine whether a traveling of the vehicle is in an unnatural state in response to determining that the vehicle is in the safe state;
      make the priority of the notification information related to a driving method higher than the notification information related to traveling control or driving instructions of the vehicle in response to determining that the traveling of the vehicle is not in the unnatural state; and make the priority of the notification information related to the traveling control or the driving instructions of the vehicle higher than the notification information related to the driving method in response to determining that the traveling of the vehicle is in the unnatural state.

15. The vehicle notification system according to claim 14, wherein the priority setting unit is configured to determine that the traveling of the vehicle is in the unnatural state in a case where a relative distance of a preceding vehicle becomes longer than a second distance threshold value and a relative speed of the preceding vehicle becomes faster than a second speed threshold value.

16. A vehicle notification system, comprising:

a memory; and a processor, wherein a set of computer-executable instructions are stored on the memory so that the processor is configured to:

acquire surrounding information of a vehicle;

set a priority of a plurality of items that include notification information based on the surrounding information of the vehicle; and perform notification of at least one item selected from a plurality of items of notification information to a notification target person based on the set priority, wherein the processor:

determine whether the vehicle is in a safe state based on the surrounding information of the vehicle;

make a priority of the notification information related to a driving method higher than a priority of the notification information related to safety in response to determining that the vehicle is in the safe state; and make the priority of the notification information related to the safety higher than the priority of the notification information related to the driving method in response to determining that the vehicle is not in the safe state.

* * * * *